(12) United States Patent
Zhao et al.

(10) Patent No.: US 9,405,826 B1
(45) Date of Patent: Aug. 2, 2016

(54) SYSTEMS AND METHODS FOR DIGITAL SIGNAL PROCESSING

(71) Applicant: Marvell International Ltd., Hamilton (BM)

(72) Inventors: Xueming Zhao, Shanghai (CN); Fu Zhen, Shanghai (CN); Nenghua Cao, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 178 days.

(21) Appl. No.: 14/331,502

(22) Filed: Jul. 15, 2014

Related U.S. Application Data

(60) Provisional application No. 61/846,373, filed on Jul. 15, 2013.

(51) Int. Cl.
*G06F 17/00* (2006.01)
*G06F 17/30* (2006.01)

(52) U.S. Cl.
CPC .................................. *G06F 17/3074* (2013.01)

(58) Field of Classification Search
CPC .................. G06F 17/3074; H04M 1/58–1/62; H04M 1/78; H04M 3/568; H04M 3/569; H04M 5/14; H04M 5/16; H04M 2201/00–2201/80

USPC .......................... 379/88.01–88.07, 165, 166, 379/406.1–406.16, 387.01–397; 704/270–278; 700/94; 381/94.1–109, 381/118–121, 123
See application file for complete search history.

(56) References Cited

U.S. PATENT DOCUMENTS

| | | | | | |
|---|---|---|---|---|---|
| 6,049,818 | A | * | 4/2000 | Leijten | G06F 15/82 710/20 |
| 7,269,658 | B2 | * | 9/2007 | Tao | H04L 29/06027 370/401 |
| 7,739,603 | B2 | * | 6/2010 | Miyamoto | G06F 17/5045 709/220 |
| 8,224,775 | B2 | * | 7/2012 | Schwartz | G06F 17/30029 707/610 |
| 2005/0193366 | A1 | * | 9/2005 | Boland | G06F 9/465 717/104 |
| 2006/0161430 | A1 | * | 7/2006 | Schweng | G10L 25/78 704/233 |
| 2014/0355789 | A1 | * | 12/2014 | Bohrarper | H04R 3/00 381/119 |

\* cited by examiner

*Primary Examiner* — Hemant Patel

(57) ABSTRACT

Systems and methods are provided for audio processing. A system includes: a component manager and a pipeline manager. The component manager is configured to communicate with a host system and manage one or more components for processing an audio stream. A component is associated with one or more audio processing functions. The pipeline manager is configured to manage one or more connections among the components. The connections indicate a processing flow involving the components.

29 Claims, 4 Drawing Sheets

SYSTEMS AND METHODS FOR DIGITAL SIGNAL PROCESSING

CROSS-REFERENCE TO RELATED APPLICATIONS

This disclosure claims priority to and benefit from U.S. Provisional Patent Application No. 61/846,373, filed on Jul. 15, 2013, the entirety of which is incorporated herein by reference.

FIELD

The technology described in this patent document relates generally to signal processing and more particularly to digital signal processing.

BACKGROUND

Digital signal processing (DSP) is often implemented for audio signal processing of electronic devices (e.g., mobile phones). DSP usually involves mathematical manipulation of audio signals to modify or improve the signals in some way. For example, DSP related firmware uses different sets of application programming interfaces (APIs) to determine a signal processing task (e.g., playback, recording), and a calling sequence of different functions can be established to perform the task.

SUMMARY

In accordance with the teachings described herein, systems and methods are provided for audio processing. A system includes: a component manager and a pipeline manager. The component manager is configured to communicate with a host system and manage one or more components for processing an audio stream. A component is associated with one or more audio processing functions. The pipeline manager is configured to manage one or more connections among the components. The connections indicate a processing flow involving the components.

In one embodiment, a method is provided for audio processing. Communications with a host system are carried out. One or more components are generated for audio processing based at least in part on the communication with the host system. A component is associated with one or more audio processing functions. One or more connections are established among the components. The connections indicate a processing flow involving the components. The audio stream is processed using the components and the connections.

In another embodiment, a system for audio processing includes: one or more processors for digital signal processing and a computer-readable storage medium. The processors are configured to: communicate with a host system; manage one or more components for processing an audio stream, a component being associated with one or more audio processing functions; and manage one or more connections among the components, the connections indicating a processing flow involving the components. The computer-readable storage medium is configured to store data related to the components and data related to the connections.

DETAILED DESCRIPTION

Using APIs and calling sequences for DSP tasks has some disadvantages. For example, for each new task, APIs often need to be modified and selected to provide a new interface to a host central processing unit (CPU), which may cause inefficiency of signal processing. In addition, in conventional DSP processing systems, data commands and control commands are often both treated as private commands, and the host CPU often needs to know details of the DSP implementation to provide correct command sequences for different DSP tasks.

Figure 1:
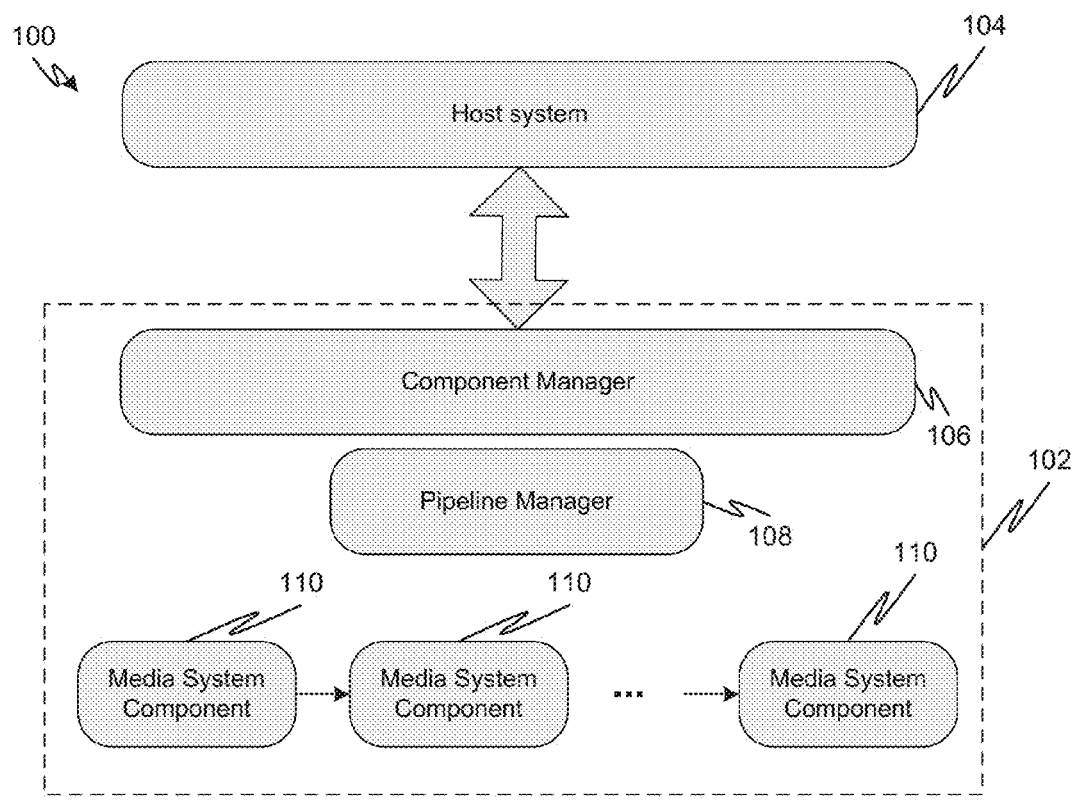
FIG. 1 depicts an example diagram showing a framework for signal processing.

FIG. 1 depicts an example diagram showing a framework for signal processing. As shown in FIG. 1, a DSP processing system 102 communicates with a host system 104 for signal processing through one or more media system components 110. The components 110 are associated with certain signal processing functions. The communication between the host system 104 and the DSP processing system 102 is not carried out through APIs, and the DSP implementation details can be shielded from the host system 104.

Particularly, a component manager 106 communicates with the host system 104 and creates (e.g., dynamically) the media system components 110. Each media system component includes one or more audio processing functions. The component manager 106 links the media system components 110 by establishing connections between the components 110, and the connections indicate a processing flow involving the components 110. The component manager 106 can also release (e.g., dynamically) one or more components based on actual needs for signal processing. For a particular DSP task, the host system 104 does not need to know the DSP implementation details for generating a command sequence. Instead, a processing flow is set up for the task through the connections between the components 110. A pipeline manager 108 maintains the connections between the components 110 and changes (e.g., dynamically) the connections based on the communication with the host system 104.

In some embodiments, a DSP task includes playback of an audio signal. The component manager 106 creates the components 110 that include a collection component, a decode component, and a playback component. In addition, the component manager generates connections among these created components and a processing flow is determined accordingly to carry out the playback of the audio signal. For example, the collection component is connected to the decode component that is connected to the playback component. The collection component collects an audio signal first, and the decode component decodes the collected audio signal. Then, the playback component performs playback of the decoded audio signal.

Once the components are created, they can be reused for processing different audio streams, and the connections among the components may be changed accordingly. As an example, the host system 104 includes one or more central processing units (CPUs), and the DSP processing system 102 includes one or more DSP processors.

Figure 2:
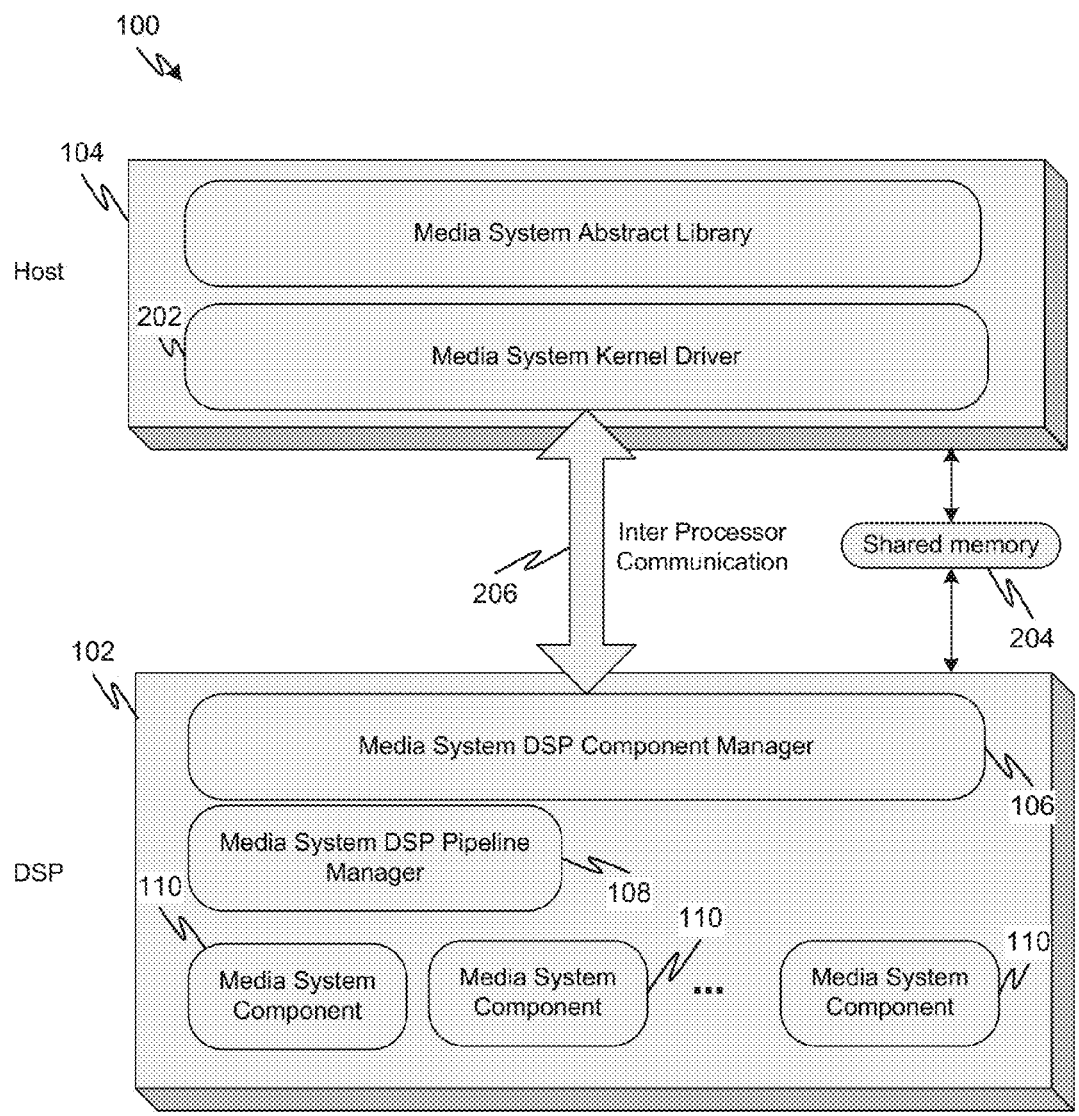
FIG. 2 depicts another example diagram showing a framework for signal processing.

FIG. 2 depicts another example diagram showing a framework for signal processing. As shown in FIG. 2, the host system 104 handles the components 110 through communication with the command manager 106. Specifically, the host system 104 can cause the command manager 106 to create the components 110, query the component manager 106 to find components supported by the DSP processing system 102, establish connections among the components 110, and/or release one or more of the components 110 based on actual needs. In addition, the host system 104 can manage the connections among the components 110 through the pipeline manager 108, and can cause the pipeline manager 108 to change (e.g., dynamically) the connections among the components 110 without stopping the processing of an audio stream. The DSP firmware (e.g., including the component manager 106 and the pipeline manager 108) implements a message queue mechanism for managing the components 110.

A kernel driver 202 within the host system 104 provides an interface for transferring commands and/or data between the components 110 and user applications running on the host system 104. The host system 104 and the DSP processing system 102 exchange control commands and data. For example, an inter-processor communication interface 206 and a shared memory 204 are used for physical connections between the host system 104 and the DSP processing system 102.

For the exchange of control commands, a data structure in the shared memory 204 is determined. When the host system 104 needs to send a control command to the DSP processing system 102, the host system 104 prepares the control command according to the determined data structure and stores the control command in the shared memory 204. Then, the host system 104 sends an interrupt to the DSP processing system 102 through the inter-processor communication interface 206. When the DSP processing system 102 begins operations in response to the interrupt, the DSP processing system 102 reads the data structure stored in the shared memory 204 and analyzes the data structure within an interrupt processing routine to obtain the control command sent from the host system 104. Similarly, when the DSP processing system 102 needs to send a control command to the host system 104, the DSP processing system 102 prepares the control command according to the data structure and stores the control command in the shared memory 204. Then, the host system 104 reads the data structure stored in the shared memory 204 and analyzes the data structure to obtain the control command sent from the DSP processing system 102.

For the exchange of data, the host system 104 prepares a set of descriptors associated with a buffer that stores data to be exchanged. The host system 104 sends the descriptors to the DSP processing system 102 through a control command transferring process as described above. The DSP processing system 102 analyzes one or more control commands received from the host system 104 and extracts the descriptors from the received control commands. Then, the DSP processing system 102 acquires the data to be exchanged from the buffer using the extracted descriptors.

Figure 3:
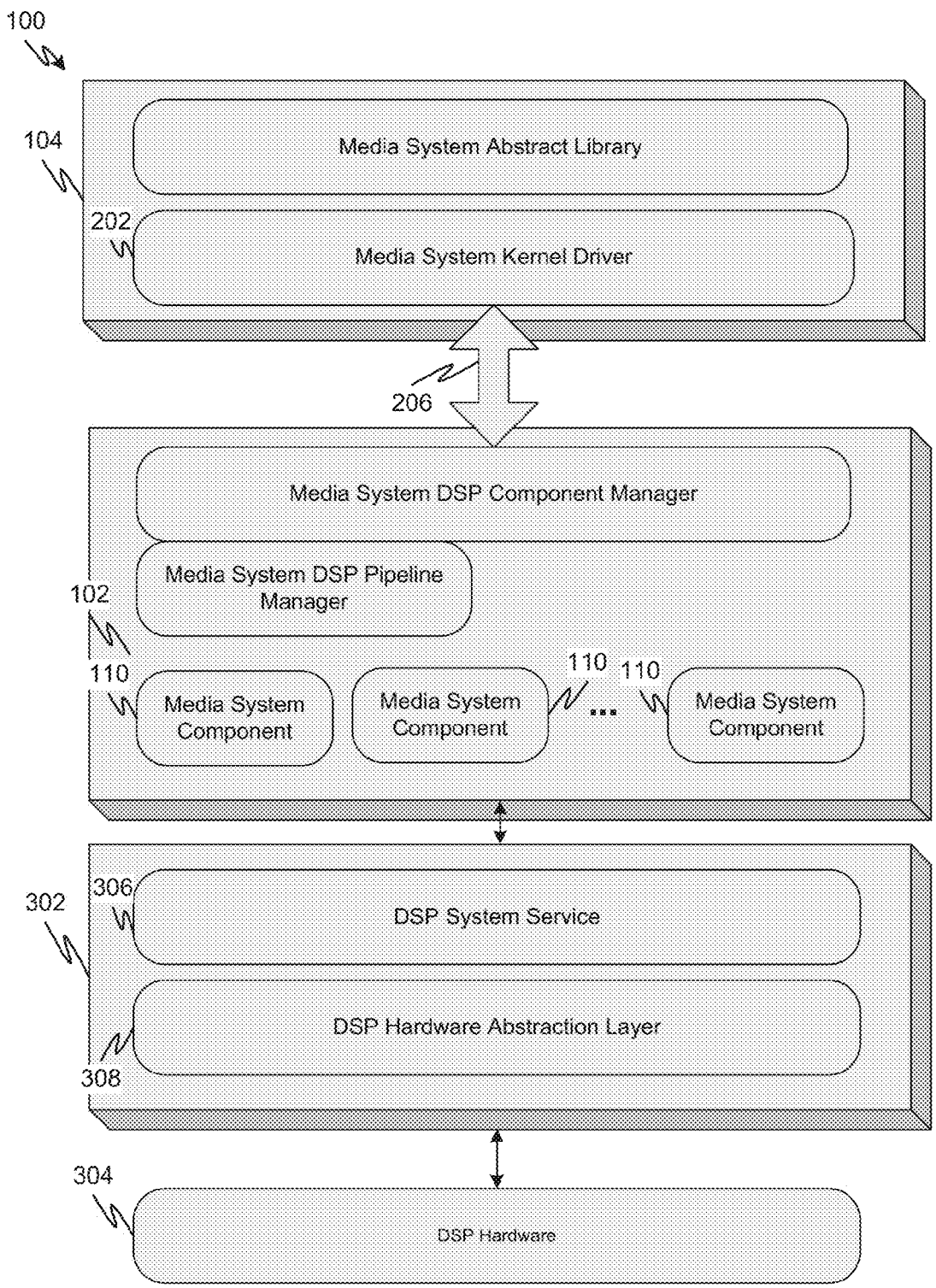
FIG. 3 depicts another example diagram showing a framework for signal processing.

FIG. 3 depicts another example diagram showing a framework for signal processing. As shown in FIG. 3, a DSP system service layer 306 and a DSP hardware abstract layer 308 included in a low-level software component 302 provide basic features of the framework 100. Specifically, the DSP system service layer 306 provides advanced functions, such as system timing services and message queue services. The DSP hardware abstract layer 308 encapsulates one or more DSP hardware registers, and processes one or more hardware interrupts. A DSP hardware layer 304 communicates with the low-level software component 302 to perform hardware operations for signal processing. The framework 100 may be implemented in various electronic devices, e.g., portable devices, mobile phones, etc.

Figure 4:
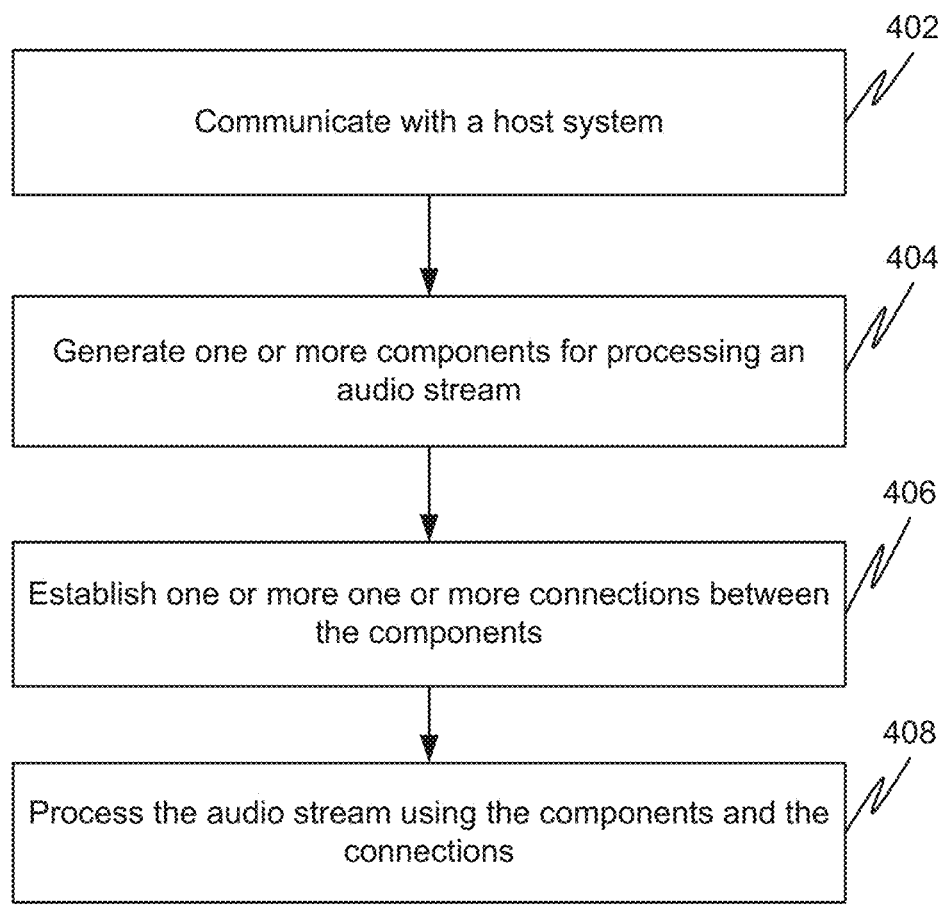
FIG. 4 depicts an example flow chart for signal processing.

FIG. 4 depicts an example flow chart for signal processing. As shown in FIG. 4, at 402, communications with a host system are carried out, e.g., for a DSP processing system. At 404, one or more components are generated for audio processing based at least in part on the communication with the host system. Each component is associated with one or more audio processing functions. At 406, one or more connections are established among the components. The connections indicate a processing flow involving the components. At 408, the audio stream is processed using the components and the connections.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for audio processing, the system comprising:
   a component manager configured to communicate with a host system and manage one or more components for processing an audio stream, a component being associated with one or more audio processing functions;
   a pipeline manager configured to manage one or more connections among the components, the connections indicating a processing flow involving the components; and
   a digital signal processing (DSP) service component configured to provide one or more DSP functions for processing the audio stream using the components, the DSP functions including system timing services and message queue services; and
   a DSP hardware abstraction layer component configured to encapsulate one or more registers and process one or more interrupts.

2. The system of claim 1, wherein the components share a same data structure.

3. The system of claim 1, wherein the component manager is further configured to reuse the components for processing different audio streams.

4. The system of claim 1, wherein the component manager and the pipeline manager are included in a digital signal processing (DSP) system.

5. The system of claim 1, wherein the component manager is further configured to, based at least in part on the communication with the host system:
   query the components;
   generate the components;
   generate the connections among the components; or
   release the components.

6. The system of claim 1, wherein the pipeline manager is further configured to maintain and change the connections.

7. The system of claim 1, further comprising:
an inter-processor communication interface configured to facilitate the communication between the host system and the component manager, and
a shared memory configured to store first data related to audio processing.

8. The system of claim 7, wherein:
the first data is generated by the host system and associated with one or more commands; and
the component manager is further configured to, in response to an interrupt from the host system, access the first data and extract the commands from the first data.

9. The system of claim 7, wherein the component manager is further configured to generate and store the first data for the host system to access.

10. The system of claim 7, wherein:
the first data is generated by the host system and associated with one or more descriptors of a buffer that includes second data; and
the component manager is further configured to access the first data, extract the descriptors from the first data, and obtain the second data from the buffer.

11. A method for audio processing, the method comprising:
communicating with a host system;
generating one or more components for processing an audio stream based at least in part on the communication with the host system, a component being associated with one or more audio processing functions;
establishing one or more connections among the components, the connections indicating a processing flow involving the components;
processing the audio stream using the components and the connections; and
in response to an interrupt from the host system,
accessing data associated with one or more commands stored in a shared memory; and
extracting the commands from the data.

12. The method of claim 11, wherein the components share a same data structure.

13. The method of claim 11, further comprising:
reusing the components for processing different audio streams.

14. The method of claim 11, further comprising:
releasing the components based at least in part on the communication with the host system.

15. The method of claim 11, further comprising:
maintaining and changing the connections.

16. The method of claim 11, further comprising:
generating data associated with one or more commands; and
storing the data in the shared memory for the host system to access.

17. The method of claim 11, further comprising:
accessing first data stored in the shared memory, the first data being associated with one or more descriptors of a buffer that includes second data;
extracting the descriptors from the first data; and
obtaining the second data from the buffer.

18. A system for audio processing, the system comprising:
a component manager configured to communicate with a host system and manage one or more components for processing an audio stream, a component being associated with one or more audio processing functions;
a pipeline manager configured to manage one or more connections among the components, the connections indicating a processing flow involving the components;
an inter-processor communication interface configured to facilitate the communication between the host system and the component manager; and
a shared memory configured to store first data related to audio processing, wherein the first data is generated by the host system and associated with one or more descriptors of a buffer that includes second data;
wherein the component manager is further configured to access the first data, extract the descriptors from the first data, and obtain the second data from the buffer.

19. The system of claim 1, wherein the components share a same data structure.

20. The system of claim 1, wherein the component manager is further configured to reuse the components for processing different audio streams.

21. The system of claim 18, wherein the component manager is further configured to, based at least in part on the communication with the host system:
query the components;
generate the components;
generate the connections among the components; or
release the components.

22. The system of claim 18, wherein the pipeline manager is further configured to maintain and change the connections.

23. The system of claim 18, further comprising:
a digital signal processing (DSP) service component configured to provide one or more DSP functions for processing the audio stream using the components, the DSP functions including system timing services and message queue services; and
a DSP hardware abstraction layer component configured to encapsulate one or more registers and process one or more interrupts.

24. A method for audio processing, the method comprising:
communicating with a host system;
generating one or more components for processing an audio stream based at least in part on the communication with the host system, a component being associated with one or more audio processing functions;
establishing one or more connections among the components, the connections indicating a processing flow involving the components;
processing the audio stream using the components and the connection;
accessing first data stored in a shared memory, the first data being associated with one or more descriptors of a buffer that includes second data;
extracting the descriptors from the first data; and
obtaining the second data from the buffer.

25. The method of claim 24, wherein the components share a same data structure.

26. The method of claim 24, further comprising:
reusing the components for processing different audio streams.

27. The method of claim 24, further comprising:
releasing the components based at least in part on the communication with the host system.

28. The method of claim 24, further comprising:
in response to an interrupt from the host system,
accessing data associated with one or more commands stored in the shared memory; and
extracting the commands from the data.

29. The method of claim 24, further comprising:
generating data associated with one or more commands; and
storing the data in the shared memory for the host system to access.

* * * * *